US011968175B2

(12) United States Patent
Nguyen et al.

(10) Patent No.: US 11,968,175 B2
(45) Date of Patent: Apr. 23, 2024

(54) BLOCKED XOR FILTER FOR BLACKLIST FILTERING

(71) Applicant: Avast Software s.r.o., Prague (CZ)

(72) Inventors: Hai Tung Nguyen, Weingarten (DE); Christopher Joseph O'Connell, Tucson, AZ (US); Barna Csukas, Miercurea Ciuc (RO); Thomas Salomon, Neukirch (DE)

(73) Assignee: Avast Software s.r.o., Prague (CZ)

( * ) Notice: Subject to any disclaimer, the term of this patent is extended or adjusted under 35 U.S.C. 154(b) by 347 days.

(21) Appl. No.: 17/568,370

(22) Filed: Jan. 4, 2022

(65) Prior Publication Data

US 2023/0231828 A1 Jul. 20, 2023

(51) Int. Cl.
*H04L 9/40* (2022.01)
*H04L 47/78* (2022.01)
*H04L 67/02* (2022.01)

(52) U.S. Cl.
CPC ........ *H04L 63/0236* (2013.01); *H04L 47/781* (2013.01); *H04L 63/20* (2013.01); *H04L 67/02* (2013.01)

(58) Field of Classification Search
CPC ... H04L 63/0236; H04L 47/781; H04L 63/20; H04L 67/02; H04L 63/101; H04L 63/1441; H04L 63/1483

USPC .......................................................... 726/11
See application file for complete search history.

(56) References Cited

U.S. PATENT DOCUMENTS

| 9,236,874 | B1 * | 1/2016 | Rossum | H03M 5/10 |
| 2006/0026147 | A1 * | 2/2006 | Cone | G06F 16/9538 |
| 2010/0154055 | A1 * | 6/2010 | Hansen | H04L 63/1483 707/E17.014 |
| 2022/0021519 | A1 * | 1/2022 | Locketz | G06F 8/65 |

OTHER PUBLICATIONS

Thomas Mueller Graf and Daniel Lemire; Xor Filters: Faster and Smaller Than Bloom and Cuckoo Filters. Accessed at: arXiv:1912.08258v3 [cs.DS] Jan. 27, 2020.

* cited by examiner

*Primary Examiner* — Jacob Lipman
(74) *Attorney, Agent, or Firm* — AVEK IP, LLC; Mark C. Young; William B. Kircher (57) ABSTRACT

A method of filtering a URL against a blacklist includes receiving at least a portion of a Uniform Resource Locator (URL), and determining which of a plurality of XOR filters is applicable to the received at least a portion of a URL, where each of the plurality of XOR filters represents a different portion of a URL blacklist. At least a portion of a URL is forwarded to the applicable one of the plurality of XOR filters, and the at least a portion of the URL is processed in the applicable one of the plurality of XOR filters to produce an output indicating whether the URL is likely on the blacklist.

20 Claims, 5 Drawing Sheets

BLOCKED XOR FILTER FOR BLACKLIST FILTERING

FIELD

The invention relates generally to security in computerized systems, and more specifically to using a blocked XOR filter for blacklist filtering, such as in a computerized URL blacklist filter.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats and to facilitate the storage and distribution of data within the computer system. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities. Websites that are determined likely to be malicious can be identified on a blacklist that is distribute to end user client devices, lessening the burden on each client device to scan the content of each web page.

But, blacklists have limitations too in that a typical blacklist database may have 10 million or more rules that have to be evaluated quickly when loading a web page, often including different rule types or formats. Further, updates to blacklist rules can happen quite frequently, sometimes as often as every minute, making storage of modified rule sets as challenging a task as quickly evaluating such a large rule set.

For reasons such as these, it is desirable to quickly manage processes such as updates to URL blacklists, application of URL blacklists to an end user-requested resource, and similar blacklist operations.

SUMMARY

One example embodiment of the invention comprises a method of filtering a URL against a blacklist, including receiving at least a portion of a Uniform Resource Locator (URL) and determining which of a plurality of XOR filters is applicable to the received at least a portion of a URL, where each of the plurality of XOR filters represents a different portion of a URL blacklist. At least a portion of a URL is forwarded to the applicable one of the plurality of XOR filters, and the at least a portion of the URL is processed in the applicable one of the plurality of XOR filters to produce an output indicating whether the URL is likely on the blacklist.

In a further example, the at least a portion of the URL is hashed to determine which of the plurality of XOR filters is applicable to the received at least a portion of a URL, such as by using at least a portion of the hash to select a corresponding XOR filter comprising a part of the blocked XOR filter.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java' applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection and classification of vulnerabilities within computerized systems remain a significant challenge. New anti-malware algorithms, signature files of known malicious executable code, and blacklists of known malicious URL or similar networked resources are therefore constantly under development.

Signatures and blacklists are often updated frequently and can comprise very large data sets that are desirably efficiently compared against an executable or requested URL. In a single typical browsing session, hundreds of URLs are compared against the blacklist, including URLs for various pages, images, videos, and other resources loaded as part of the browser session. Further, the size of the blacklist often reaches the tens of millions of URLs, and updates can arrive as often as only a minute apart or more.

To effectively apply the blacklist against the requested URLs, the data storage, lookup speed, and computing power of common devices such as smartphones should be able to produce useful scanning results. Further, updates to the blacklist should be incremental, or reflect only changes since the last blacklist received, rather than require downloading the entire blacklist to reflect just a few new URL records.

For reasons such as these, some examples presented herein provide a data structure that is more compact than storing each individual entry in the blacklist, while providing for efficient incremental updates, a low false positive rate of 0.1-0.2%, and no false negatives. The data structure in a more detailed example comprises a structure called a blocked XOR filter, which comprises multiple XOR filters which each capture a different portion of the URL space to be filtered. To use the blocked XOR filter, a URL (or URL portion) of interest is received and processed to determine which of the plurality of XOR filters is applicable to the received URL, and the URL is processed against the applicable one of the plurality of XOR filters to produce an output indicating whether the URL is likely on the blacklist. Similarly, updating the blacklist comprises receiving a URL (or URL portion) to be added to the blacklist, determining which of the plurality of XOR filters is applicable to the URL to be added, and updating the complete XOR filter block of the applicable XOR filter with the updated URL.

Figure 1:
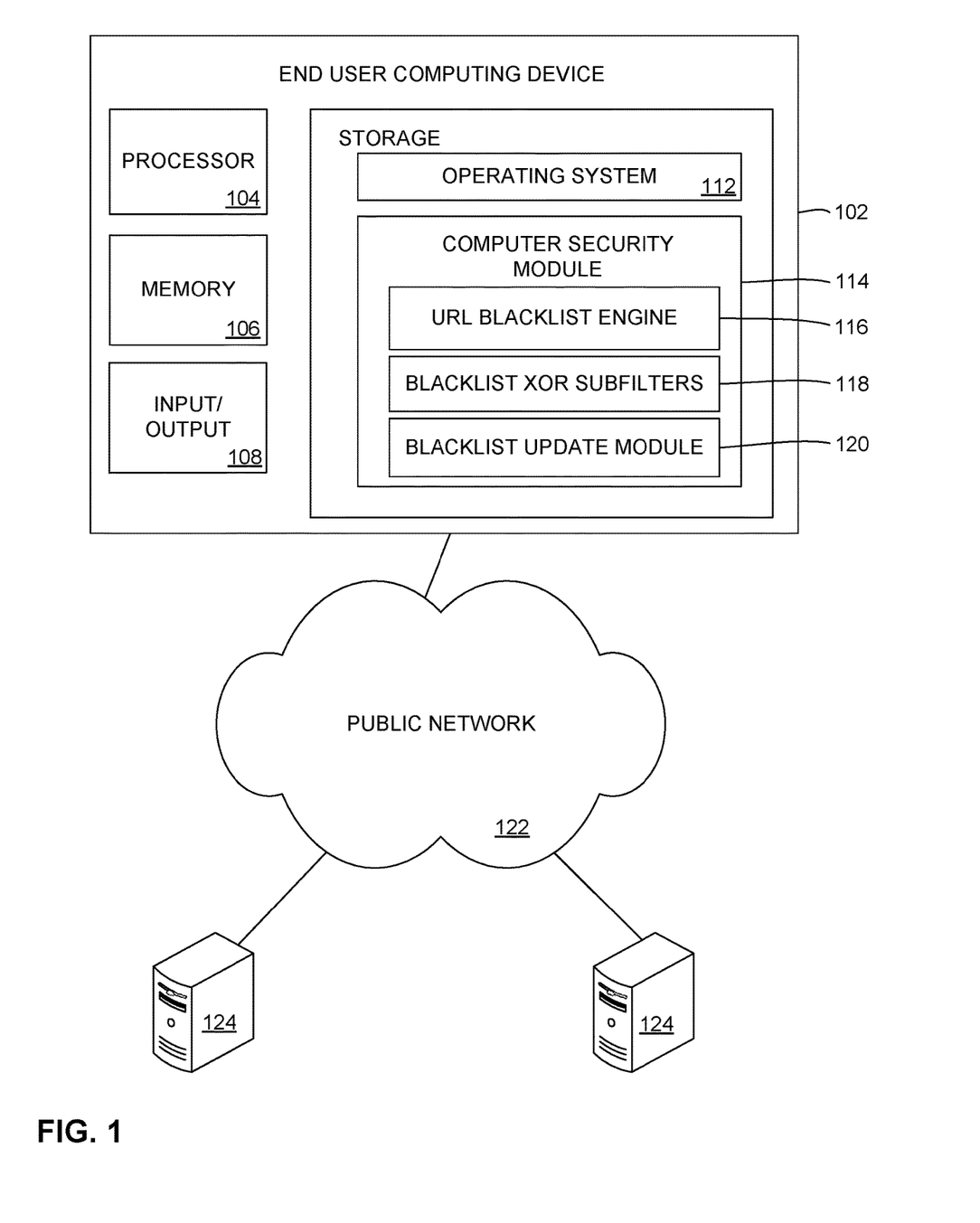
FIG. 1 shows an example end user device with a blocked XOR Uniform Resource Locator (URL) blacklist filter, consistent with an example embodiment

FIG. 1 shows an example end user device with a blocked XOR Uniform Resource Locator (URL) blacklist filter, consistent with an example embodiment. Here, a network device such as malware training system 102 comprises a processor 104, memory 106, input/output elements 108, and storage 110. Storage 110 includes an operating system 112, and a computer security module 114 such as an installed antivirus and/or antimalware application. The computer security module comprises a URL blacklist engine 116, operable to use a URL blacklist to filter requested URLs on the end user computing device. For example, a user might request a URL such as www.badsite.com/store/storefront.php from within a web browser or other application, and the computer security module's URL blacklist engine uses the URL blacklist to determine whether the URL has been blocked as a potential or known dangerous URL. In this example, a blacklist listing of badsite.com or www.badsite.com\* would block any content on the URL www.badsite.com, while more detailed blacklist entries such as www.badsite.com\forum or badsite.com\store\* would only block specific portions of the website or other resources hosted at badsite.com. Here, the blacklist entry www.badsite.com\forum would not block the www.badsite.com/store/storefront.php request, but the blacklist entry badsite.com\store\* is sufficiently broad to cover the requested URL, and when applied would result in blocked content.

The blacklist in this example is embodied via blacklist XOR subfilters 118 to provide fast lookups, fast incremental updates via blacklist update module 120, low false positives (which result in an online lookup to a backend system having a full blacklist database and large CPU and memory resources to return a value of "block" or "clean"), and no false negatives (missed URLs). The XOR filter structure in this example comprise a number of blacklist XOR subfilters, such that analysis of a requested URL can determine which of the plurality of subfilters are applicable to the requested URL. Only the XOR subfilter from the plurality of subfilters corresponding to the requested URL would therefore need to be checked for each new URL being processed, resulting in faster and more efficient processing of a URL against the blacklist via the blacklist engine 116.

In a more detailed example, the blacklist XOR subfilters are approximately equal in size and have a similar false positive rate, and are constructed based on calculating a modularization of the input URL based on the number of XOR filters in the pool of blacklist XOR filters 118. For example, a pool of blacklist XOR subfilters numbering $2^n$ can be generated by hashing every input URL to produce a unique hash value representing each input. Because subfilters must be updated completely even in the case where only a single URL is updated, a larger number of subfilters results in smaller subfilters which in turn leads to smaller updates being required. A group of bits or key with size n from the hash value (such as the first n bits) are used to sort the hashed input URL into the blacklist XOR subfilter having the same value as the key of size n. This process is repeated for each URL in the blacklist, resulting in relatively even distribution of the URLs in the blacklist to the various blacklist XOR subfilters in the pool shown at 118. In one exemplary embodiment, the pool of blacklist XOR subfilters is $2^{18}$, or 262,144 subfilters.

The target size of the blacklist XOR subfilter will then be selected based on the number of values in the XOR subfilter and the acceptable level of false positives. In this example, the size is desirably kept relatively small, with false positives of a selected threshold such as less than a five hundredths of a percent considered acceptable. Every blacklist XOR filter in the pool at 118 is then appended to a bit ranking structure which acts to reduce the total size of the package of subfilters and the size of updates, identifying occupied entries and empty entries such that only data for the occupied entries are stored. This is of particular benefit when multiple decompositions of a URL need to be checked, such as where www.badsite.com\store needs to also be checked against www.badsite.com and badsite.com to ensure the requested URL is not blacklisted. Because checking against multiple decompositions of a URL can increase the effective false positive rate, having a low false positive rate in each of the n blacklist XOR filters in the pool (such as 0.02%) can help ensure that an effective false positive rate of a fraction of a percent can be achieved even for complex URLs.

Updates to a traditional single blacklist XOR filter would typically require reconstruction of the entire filter, which takes significant memory and computational resources on the local device such as in blacklist update module 120, or transmission over a public network 122 of a very large updates XOR filter from a remote device such as a server 124 to the blacklist update module 120. With blocked XOR subfilters as shown in the example of FIG. 1, only the XOR subfilter containing the updated URL record needs to be updated for each new URL added to the blacklist. It should be understood that "updating" a URL record may include modifying an existing URL record, adding a new URL record, or removing a URL record.

Use of blocked XOR subfilters as shown in the example of FIG. 1 provides several advantages, including fast lookup, fast and efficient updates, small subfilter size with very small storage and memory requirements, and a low false positive rate.

Figure 2:
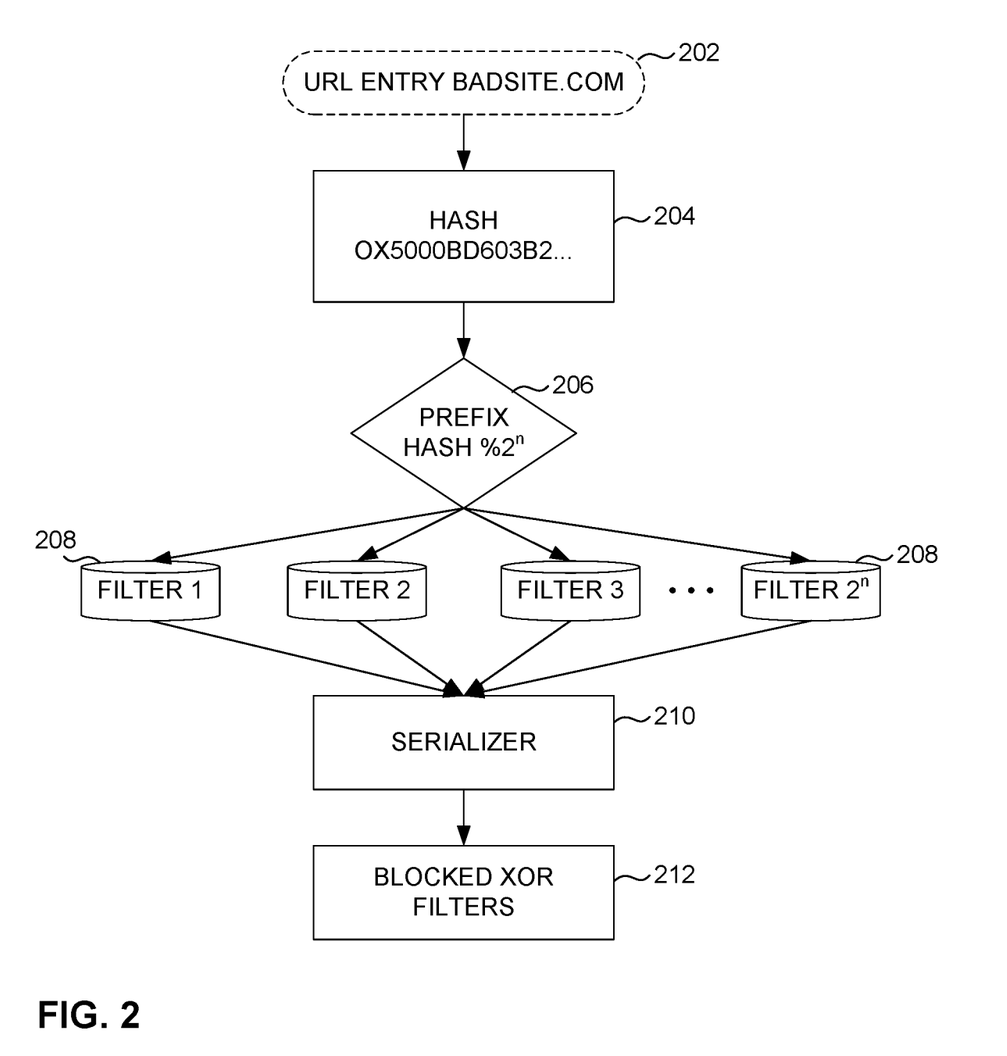
FIG. 2 is a flowchart showing construction of a blocked XOR filter, consistent with an example embodiment.

FIG. 2 is a flowchart showing construction of a blocked XOR filter, consistent with an example embodiment. Uniform Resource Locators (URLs) are added to the filter at 202, which in some examples can include tens or hundreds of millions of individual URL entries. Each URL entry in the blacklist is individually hashed at 204, using a hash function that produces a hash value of sufficient length to be indexed. The first n bits of the hash are read as a hash prefix at 206, and used to assign the URL blacklist entry to one of the blocked XOR blacklist subfilters at 208. In other examples, other methods such selecting a different n bits of a hash of the input URL are employed to generate a subfilter index value from the URL entry. Because an n-bit prefix can have $2^n$ values, there are $2^n$ different subfilters at 208 that make up the blocked XOR filter.

The hash function ensures that URLs are approximately randomly and evenly distributed among the various subfilters that make up the blocked XOR filter at 208, so that each subfilter will be similar in size and in false positive error rate. The subfilters that make up the blocked XOR filter in this example are serialized at 210, and a final blocked XOR filter is provided at 212. Because the XOR subfilters that make up the blocked XOR filter are "lossy," or do not contain an exact copy of each URL entry that is used to make the subfilter, the size of each subfilter is smaller than the size of a list of URL entries represented by each subfilter. In other examples, filters other than XOR filters, such as other lossy filter constructions, are used. The capacity of each XOR subfilter 208 is estimated in this example to be sufficiently large to produce an acceptably low or target false positive rate, and in a further example is iteratively adjusted to ensure that the desired false positive rate is met and a desired memory usage is achieved.

Figure 3:
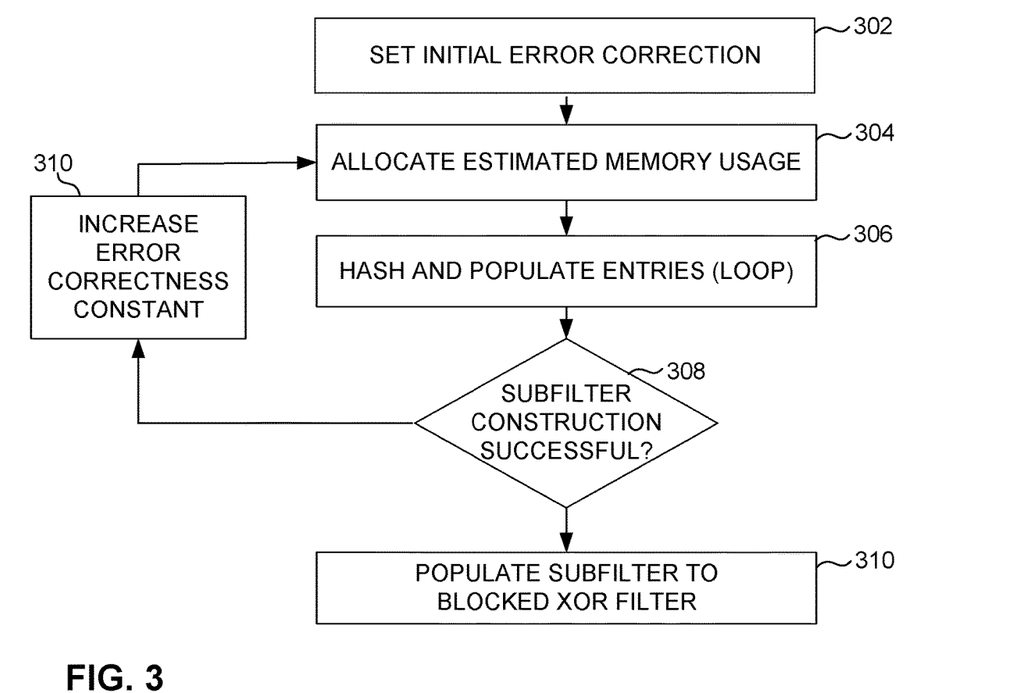
FIG. 3 is a flowchart of a method of adjusting the error correction coefficient of an XOR subfilter to ensure that the desired error correction rate is met and filter construction is successful, consistent with an example embodiment.

FIG. 3 is a flowchart of a method of adjusting the error correction coefficient of an XOR subfilter to ensure that the desired error correction rate is met and filter construction is successful. Here, an initial error correction coefficient for construction of XOR subfilters is set at 302. In a more detailed example, this is performed by using the cardinality or number of elements in the input set for that subfilter. An equation such as $c=1.23*n+32$ may be employed, where n is the cardinality or number of elements in the input set, and c is the required size or capacity of the subfilter. This estimated required size is allocated at 304, and URL entries and their hash values are processed at 306 to produce an XOR subfilter. If subfilter construction is successful and the desired false positive rate is achieved at 308, the subfilter is populated to the blocked XOR filter and can be used. If the subfilter construction failed or the desired false positive rate is too high, additional space can be allocated for construction of the XOR subfilter, such as by increasing an error correctness constant at 310, and making another attempt at constructing the XOR subfilter at 304-308. This process continues until subfilter construction is successful at 308, and a usable XOR subfilter is populated to the blocked XOR filter at 310. A more detailed example of the construction and operation of an XOR filter can be found in "XOR Filters: Faster and Smaller Than Bloom and Cuckoo Filters" by Thomas Mueller Graf and Daniel Lemire, in the Journal of Experimental Algorithmics 25 (1), 2020, which is hereby incorporated as a reference example of XOR filter construction but not as a limitation on the scope or meaning of any part or element of this document. When the subfilters are generated using the process of FIG. 3 and are serialized as shown at 210 of FIG. 2, they form a complete blocked XOR filter as shown at 212 of FIG. 2.

Figure 4:
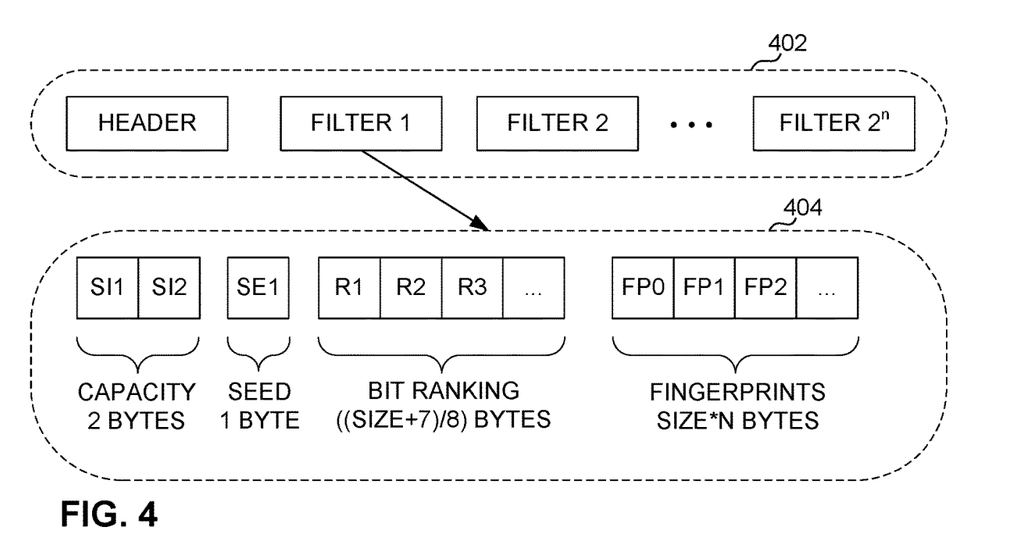
FIG. 4 shows construction of a blocked XOR filter, consistent with an example embodiment.

FIG. 4 shows construction of a blocked XOR filter, consistent with an example embodiment. Here, a serialized string comprising subfilters $1-2^n$ are appended with a header that contains information such as overall size, etc. as shown at 402, in a serialization process as described at 210 of FIG. 2. The contents of each subfilter string are shown at 404, including a capacity or size, a seed value, a bit ranking structure, and the fingerprints resulting from XOR filter processing of the input URLs. The first two bytes comprise the capacity or size of the subfilter string, while the third byte comprises the seed value used to construct the XOR subfilter. The next string of bytes are a bit ranking structure having a size based on the size of the fingerprint structure of the XOR subfilter. The bit ranking structure is an array that contains a "0" for empty entries in the fingerprint structure and a "1" for occupied entries, such that unoccupied entries in the fingerprint structure FP are not stored but are simply reference in the bit ranking structure as being empty. Only occupied entries are therefore stored in the fingerprints FP at the end of the XOR subfilter string 404. This results in significant space savings in storing the XOR subfilter, and speeds up queries in that a URL string checked against the XOR subfilter is first compared against the bit ranking, and then matched with the fingerprint data if the relevant bit rankings are "1".

False positives are also kept to a low level by the presented XOR filter data structure examples, as the hash mechanism ensures that each XOR subfilter is approximately equally likely to be chosen as another. Because each of the subfilters therefore has approximately the same size, they will have approximately the same false positive rate when built according to methods such as described in FIGS. 2-4. The false positive probability for each subfilter is approximately $1/2^k$, where k is the number of bits per fingerprint, which is also the false positive rate of the blocked XOR filter made up of n subfilters. Such an error rate is orders of magnitude better than competing products and improves as the number of entries grows larger (e.g., 0.02% for the example presented here vs. 2% for Google Safe Browsing when using 100 million entries).

Although the false positive rate of each subfilter is the same as the false positive rate of the overall blocked XOR filter, the false positive rate increases in practice if multiple decompositions of a URL need to be checked, such as where www.badsite.com\store needs to also be checked against www.badsite.com\store, www.badsite.com, and badsite.com to ensure the requested URL is not blacklisted. Because checking against multiple decompositions of a URL can increase the effective false positive rate, having a low false positive rate in each of the n blacklist XOR filters in the pool (such as 0.02%) can help ensure that an effective false positive rate of a fraction of a percent can be achieved even for complex URLs.

The process of updating a blocked XOR filter is also improved relative to traditional blacklist checking methods, in that only the subfilter that has been updated needs to be transmitted to end users to update end user blacklists. Although the difference between a prior version of a subfilter and the updated subfilter could similarly transmitted, the changes are not substantially smaller in size than the size of the serialized subfilter itself given the nature of XOR filter construction, so transmitting the entire subfilter (usually only a few kilobytes in the example presented above) may be preferred. In an exemplary embodiment, an update of approximately 2 kilobytes can be updated approximately every fifteen minutes with no undue burden on system resources.

Figure 5:
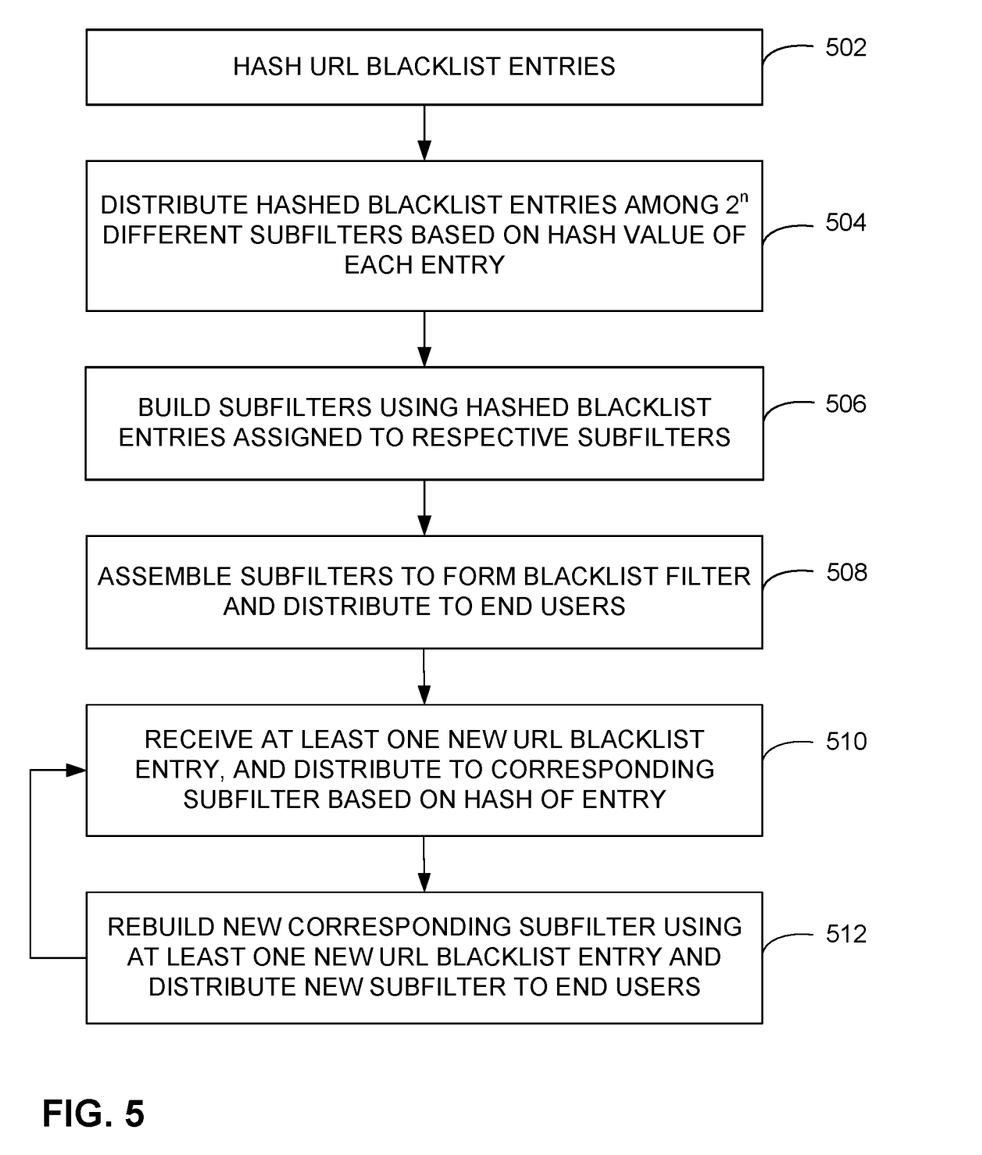
FIG. 5 is a flowchart of a method of operating a blocked filter for a URL blacklist, consistent with an example embodiment.

FIG. 5 is a flowchart of a method of operating a blocked filter for a URL blacklist, consistent with an example embodiment. Here, a list of URL blacklist entries are hashed at 502, creating a hash value associated with each URL entry in the blacklist. The hashed blacklist entries are distributed among a number $2^n$ of different subfilters based on the hash value associated with each entry at 504, such as by using the first n bits of the hash value associated with each entry to determine which sequentially numbered subfilter to which each URL blacklist entry is assigned.

Once the URL blacklist entries are assigned to the various subfilters at 504, the subfilters are built at 506, such that each sequentially numbered subfilter only includes those blacklist entries having a hash value that matches the subfilter number. The subfilters in some examples are XOR filters, but in other examples are other lossy filters such as Bloom filters that may have false positives, including filters that permit false positives but not false negatives, or are lossless filters such as a compressed list or data structure. The subfilters are assembled at 508 to form a blacklist filter that can be distributed to end users for blocking requested URLs that are on the blacklist as identified known or malicious network addresses. In a more detailed example, the end user's system hashes a requested URL (or URLs) to determine which of the plurality of subfilters making up the assembled URL blacklist filter to check the requested URL against, making for fast and efficient checking of the requested URL and its various forms or decompositions.

At 508, the URL blacklist filter provider receives at least one new URL blacklist entry to be added to the URL blacklist filter, and hashes the new URL blacklist entry or entries to determine which subfilters to which the new entry or entries are to be distributed. After the new URL blacklist entries are added to the subfilter lists, the subfilters with new entries are rebuilt at 512. Because only subfilters corresponding to the new entry or entries will change as a result of the new entry or entries, only those subfilters need to be rebuilt. If the number of subfilters is large, such as n=18 bits ($2^n$=262,144 subfilters), the size of each subfilter is a small fraction of the total size of the URL blacklist filter, so significant savings in reconstructing the URL blacklist XOR filter and in sending the update to end users can be achieved. This process is repeated at 510-512 as new updates are received which in some examples can happen several times per day or per hour.

The examples presented herein show how using a blocked XOR filter to screen for URLs on a blacklist can improve performance of the end user blacklist filter while making updates and distribution more efficient. Because a URL being checked against a blocked XOR filter only need be checked against the subfilter that corresponds to a hash of the URL, the filter is fast and efficient in operation. Further, because only the subfilter or subfilters containing updates need be rebuilt and distributed when new URLs are added to the blacklist, reconstruction and distribution of the updated blacklist is much more efficient than using a single XOR filter. Also, use of a lossy filter such as an XOR filter (or Bloom filter, or the like) that allows some false positives also permits dramatically reducing the size of the blacklist filter relative to a list of each URL element in the blacklist, further improving storage, memory, and processor utilization, and reducing the amount of data transmitted during distribution of the URL blacklist or updates. These functions are performed in many examples on a computerized system, which is operable in various examples to perform the recited functions such as hashing entries in a URL blacklist, building an XOR blacklist subfilter, assembling subfilters into a blocked XOR blacklist filter, distributing the blocked XOR blacklist filter, updating the blocked XOR blacklist filter, filtering requested URLs in an end user system using the blocked XOR blacklist filter, and other such tasks by executing software instructions on a processor, and through use of associated hardware.

Figure 6:
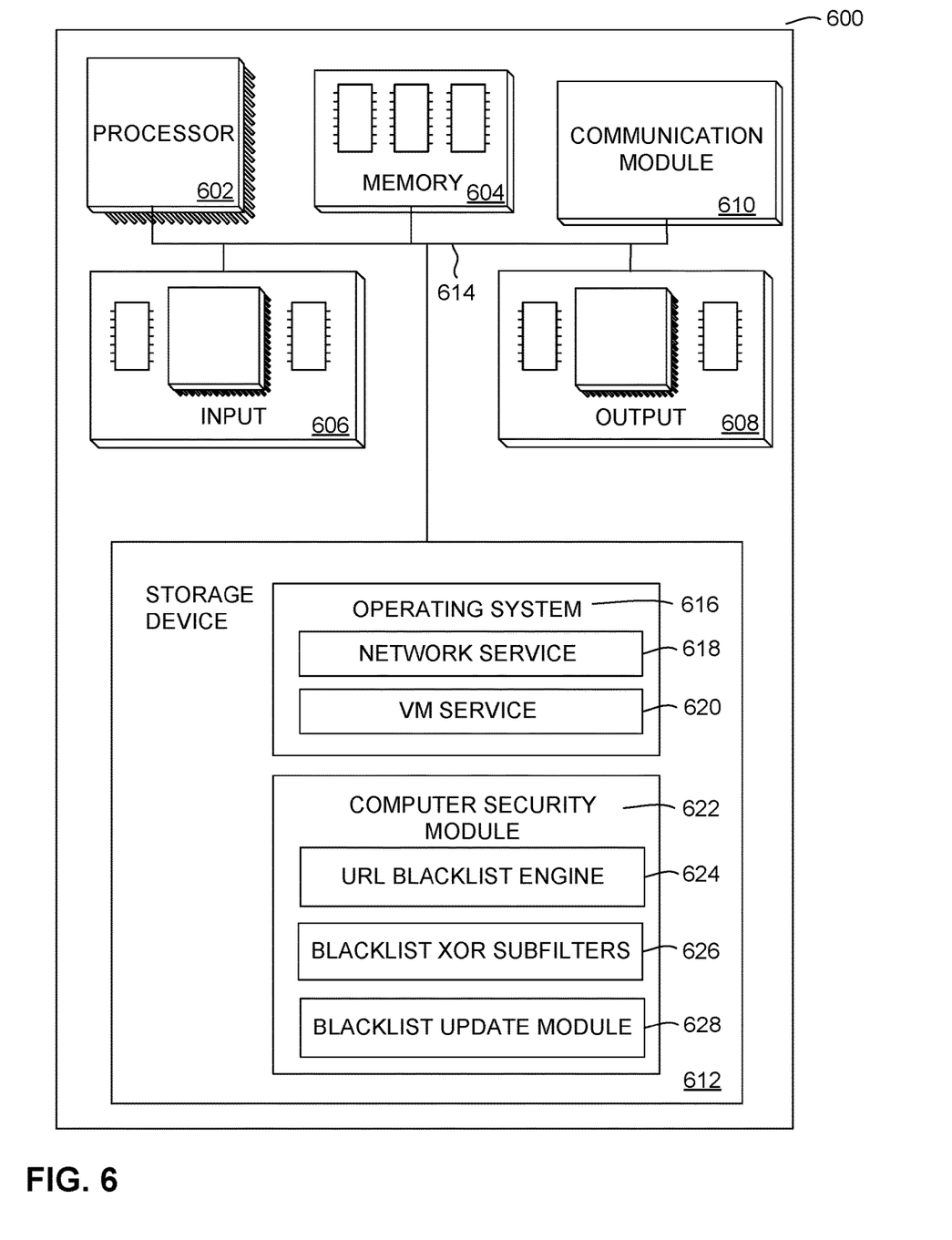
FIG. 6 is a computerized system as may be used to practice various example embodiments.

FIG. 6 is one example of such a computerized system. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600 in one example further includes an operating system 616 executable by computing device 600. The operating system includes in various examples services such as a network service 618 and a virtual machine service 620 such as a virtual server or virtualized honeypot device. One or more applications, such as computer security module 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as computer security module 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 512 is not long-term storage. Storage device 612 in some examples is a volatile memory, meaning that storage device 612 does not maintain stored contents when computing device 600 is turned off. In other examples, data is loaded from storage device 612 into memory 604 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as computer security module 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 600 uses communication module 610 to wirelessly communicate with an external device such as via public network 122 of FIG. 1.

Computing device 500 also includes in one example one or more input devices 606. Input device 606, in some examples, is configured to receive input from a user through tactile, audio, or video input. Examples of input device 606 include a touchscreen display, a mouse, a keyboard, a voice-responsive system, a video camera, a microphone, or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 608 include a speaker, a light-emitting diode (LED) display, a liquid crystal display (LCD), or any other type of device that can generate output to a user.

Computing device 600 may include operating system 616. Operating system 616, in some examples, controls the operation of components of computing device 600, and provides an interface from various applications such as computer security module 622 to components of computing device 600. For example, operating system 616, in one example, facilitates the communication of various applications such as computer security module 622 with processors 602, communication unit 610, storage device 612, input device 606, and output device 608. Applications such as computer security module 622 may include program instructions and/or data that are executable by computing device 600. As one example, computer security module 622 uses URL blacklist engine 624 to create blacklist XOR subfilters 626 that are used to filter requested URLs in end user computerized systems. The blocked XOR subfilters are updated when new URL entries are added to the blacklist via blacklist update module 628. These and other program instructions or modules may include instructions that cause computing device 600 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. For example, while the invention is described with respect to URL's and blacklisting URL's, it should be understood that the XOR filtering may likewise be applied to any other datasets, such as whitelists or any other type of data set requiring comparative analysis. These and other embodiments are within the scope of the following claims and their equivalents.

The invention claimed is:

1. A method of filtering a URL against a blacklist, comprising:
   receiving at least a portion of a Uniform Resource Locator (URL);
   determining which of a plurality of XOR filters is applicable to the received at least a portion of a URL, each of the plurality of XOR filters representing a different portion of a URL blacklist;
   forwarding the at least a portion of a URL to the applicable one of the plurality of XOR filters; and
   processing the at least a portion of the URL in the applicable one of the plurality of XOR filters to produce an output indicating whether the URL is likely on the blacklist.

2. The method of filtering a URL against a blacklist of claim 1, wherein the plurality of XOR filters have similar size.

3. The method of filtering a URL against a blacklist of claim 1, wherein the plurality of XOR filters have a similar false positive detection rate.

4. The method of filtering a URL against a blacklist of claim 1, wherein the plurality of XOR filters do not have false negative detections.

5. The method of filtering a URL against a blacklist of claim 1, further comprising hashing the at least a portion of the URL to determine which of the plurality of XOR filters is applicable to the received at least a portion of a URL.

6. The method of filtering a URL against a blacklist of claim 1, wherein checking at least a portion of a URL comprises check multiple compositions of the URL.

7. The method of filtering a URL against a blacklist of claim 1, wherein the plurality of XOR filters are constructed after the inputs from the blacklist are hashed and grouped.

8. The method of filtering a URL against a blacklist of claim 7, wherein the sizes of the plurality of XOR filters are allocated based on the number of inputs from the blacklist allocated to each XOR filter.

9. The method of filtering a URL against a blacklist of claim 8, wherein if an XOR filter constructed using the allocated size fails to produce no false negatives, the allocated size is incrementally increased and the XOR filter is constructed again.

10. The method of filtering a URL against a blacklist of claim 1, further comprising updating one or more of the plurality of XOR filters by selecting an XOR subfilter applicable to one or more added blacklist inputs, adding the one or more blacklist inputs to the inputs previously a part of the applicable XOR subfilter or subfilters, and reconstructing the applicable one or more XOR filters to include the one or more added blacklist inputs.

11. The method of filtering a URL against a blacklist of claim 10, further comprising updating the one or more of the plurality of XOR filters while the filters remain operational to process the at least a portion of the URL in the applicable one of the plurality of XOR filters to produce an output indicating whether the URL is likely on the blacklist.

12. A method of updating a URL blacklist, comprising:
receiving at least a portion of a Uniform Resource Locator (URL) to be added to the blacklist;
determining which of a plurality of XOR filters is applicable to the received at least a portion of a URL to be added to the blacklist, each of the plurality of XOR filters representing a different portion of the URL blacklist; and
reformulating the XOR filter representing the determined applicable portion of the blacklist to include the received at least a portion of the URL to be added to the blacklist.

13. The method of updating a URL blacklist of claim 12, wherein the plurality of XOR filters have similar size.

14. The method of updating a URL blacklist of claim 12, wherein the plurality of XOR filters have a similar false positive detection rate and do not have false negative detections.

15. The method of updating a URL blacklist of claim 12, further comprising hashing the at least a portion of the URL to determine which of the plurality of XOR filters is applicable to the received at least a portion of a URL.

16. The method of updating a URL blacklist of claim 12, wherein the plurality of XOR filters are constructed after the inputs from the blacklist are hashed and grouped.

17. The method of updating a URL blacklist of claim 16, wherein the sizes of the plurality of XOR filters are allocated based on the number of inputs from the blacklist allocated to each XOR filter.

18. The method of updating a URL blacklist of claim 17, wherein if an XOR filter constructed using the allocated size fails to produce no false negatives, the allocated size is incrementally increased and the XOR filter is constructed again.

19. The method of updating a URL blacklist of claim 12, further comprising checking at least a portion of a URL against the blacklist by checking the at least a portion of the URL against an XOR filter determined to be applicable to the URL to determine if the URL is blacklisted.

20. The method of updating a URL blacklist of claim 19, wherein checking at least a portion of a URL comprises check multiple compositions of the URL.

* * * * *